E. T. PETERSON.
NEWSPAPER WRAPPING AND LABELING MACHINE.
APPLICATION FILED JAN. 8, 1914.
1,113,823.
Patented Oct. 13, 1914.
8 SHEETS—SHEET 2.
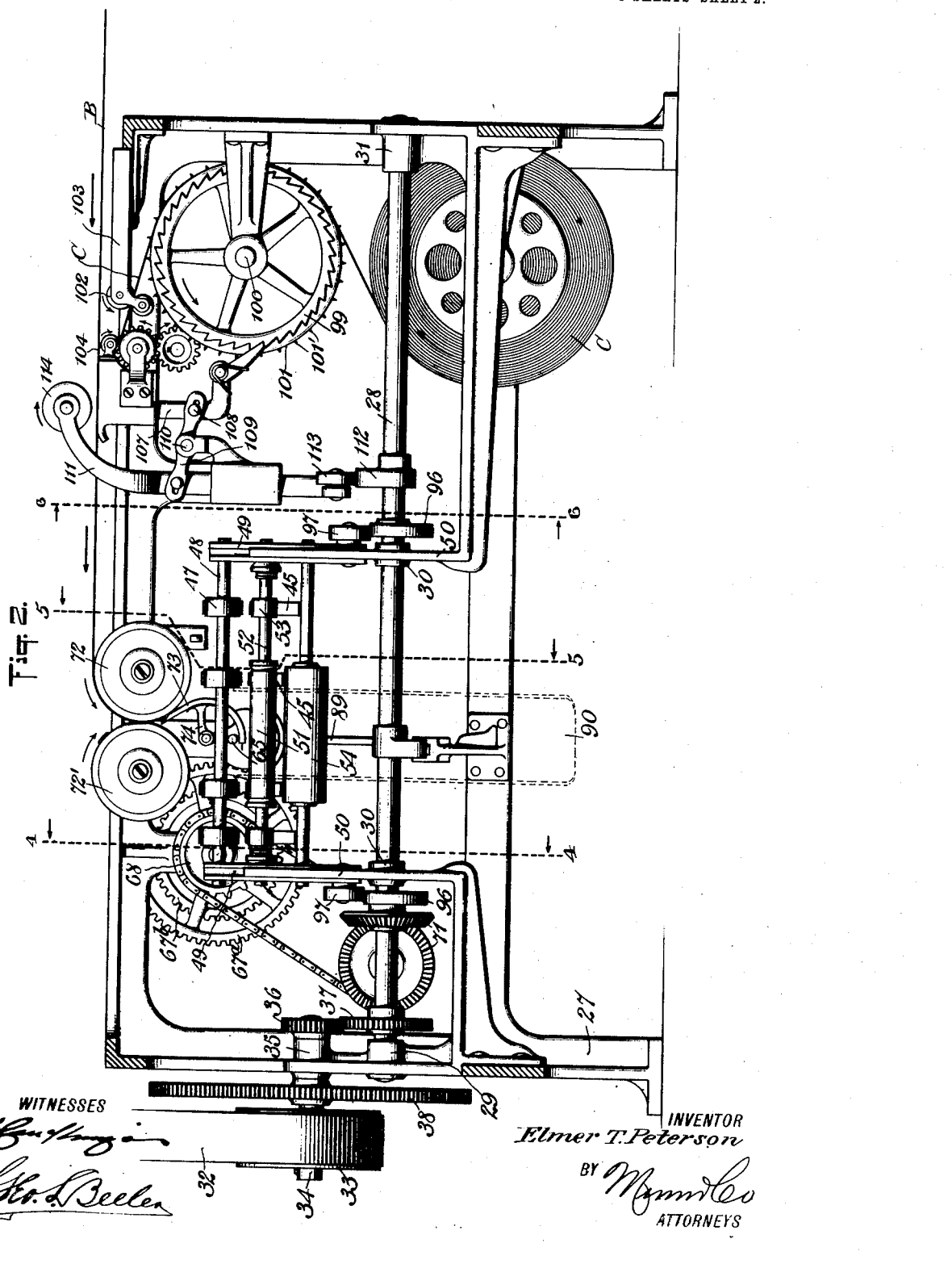

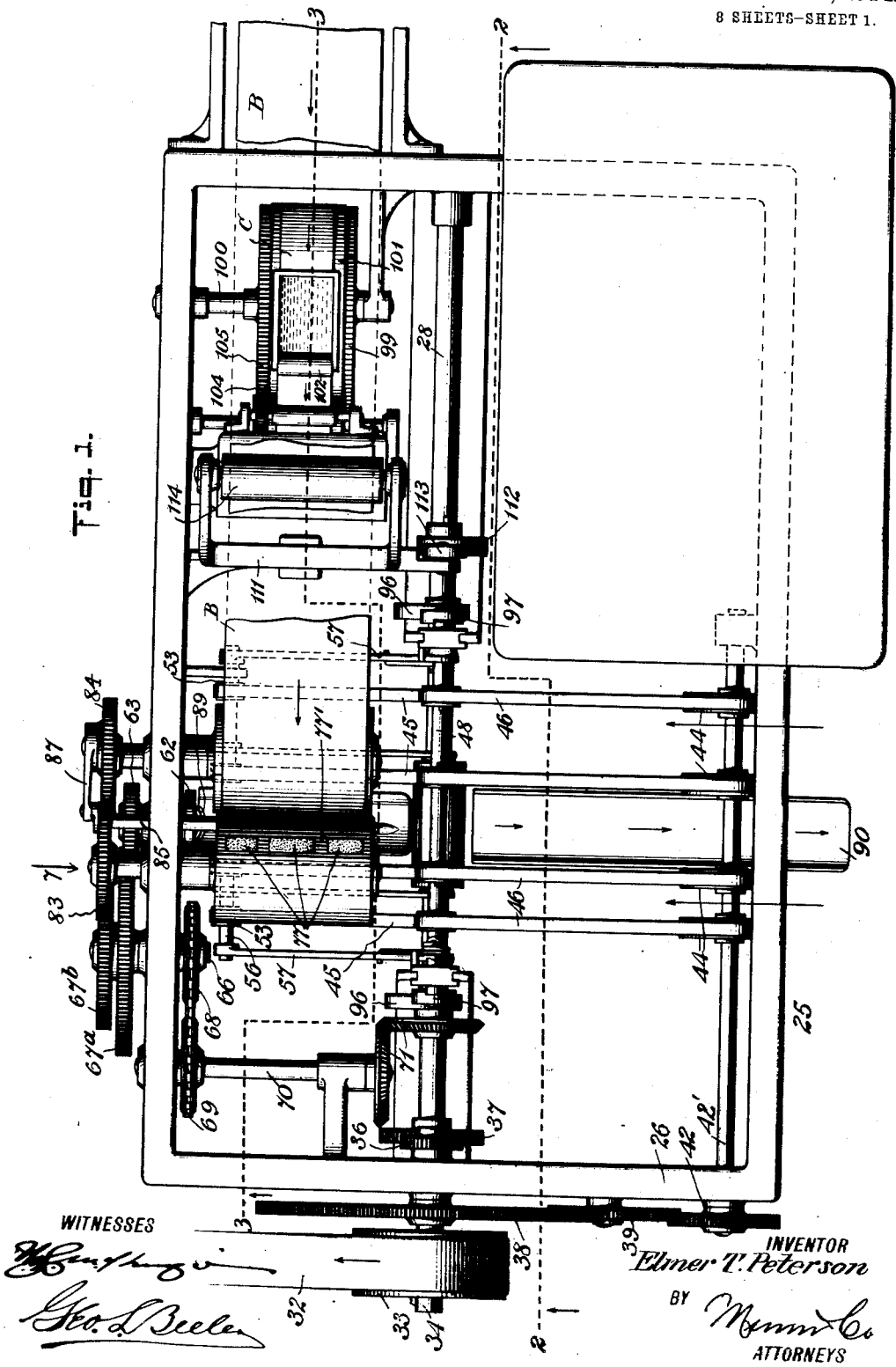

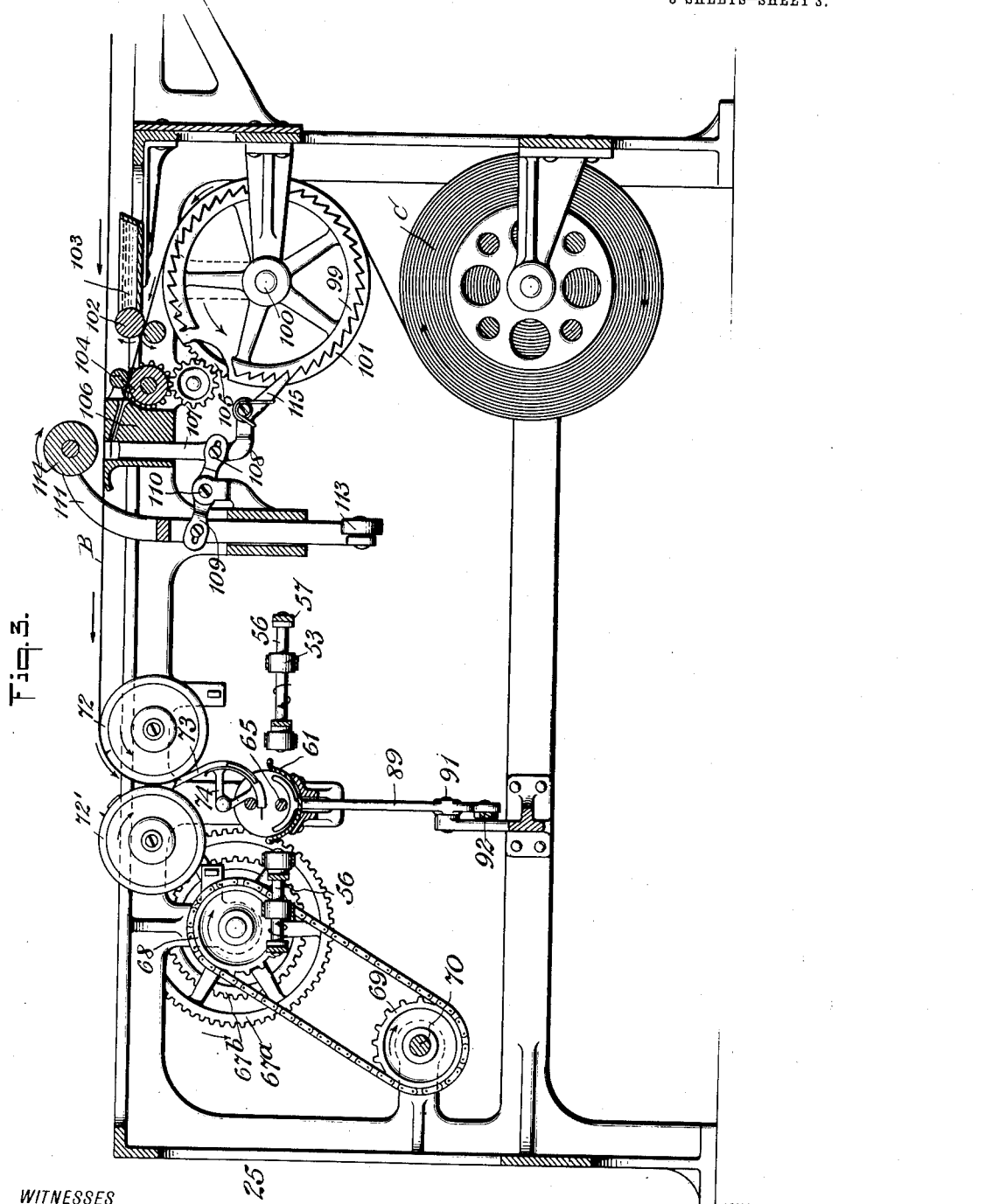

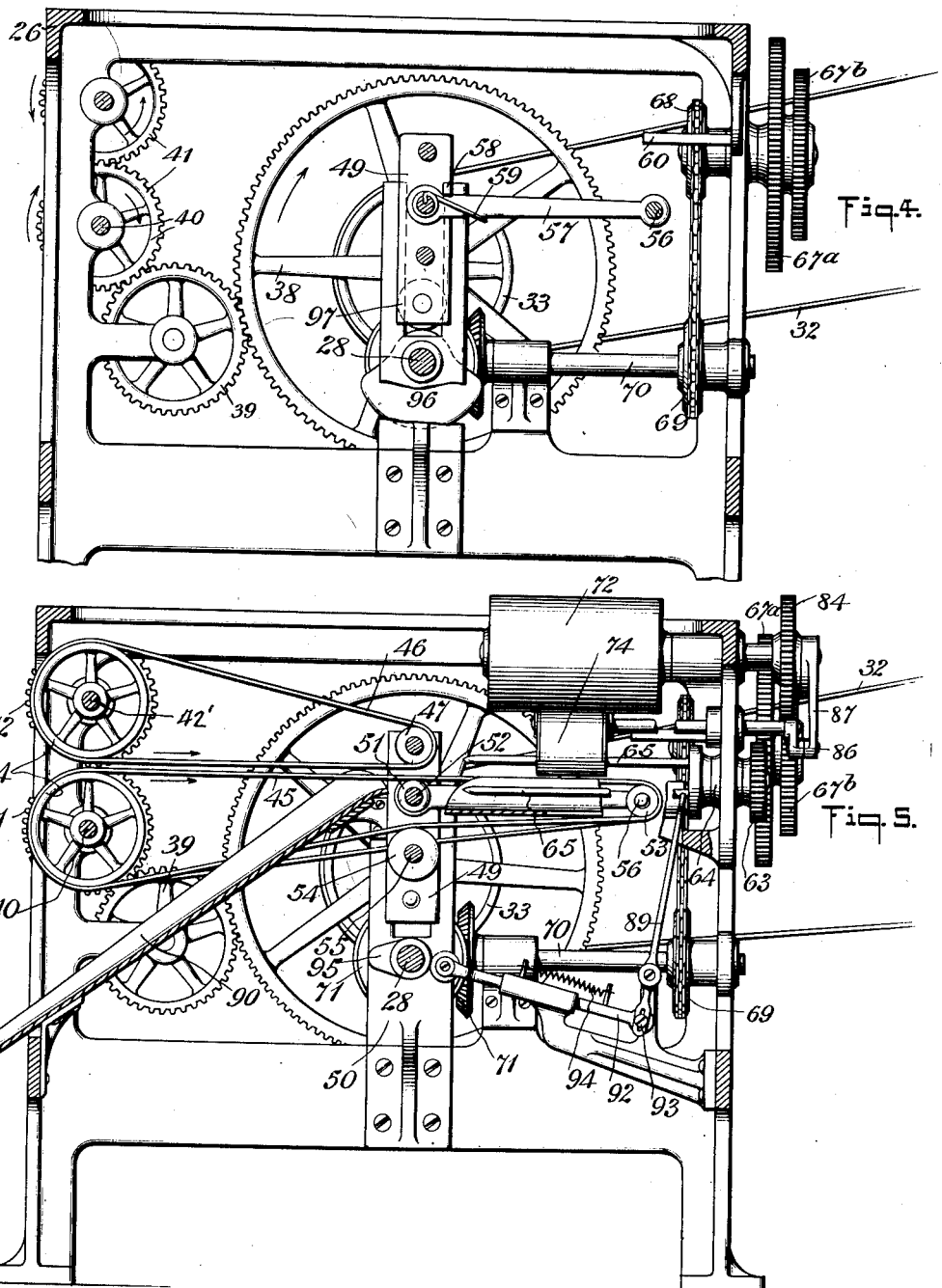

E. T. PETERSON.
NEWSPAPER WRAPPING AND LABELING MACHINE.
APPLICATION FILED JAN. 8, 1914.
1,113,823.
Patented Oct. 13, 1914.
8 SHEETS—SHEET 5.
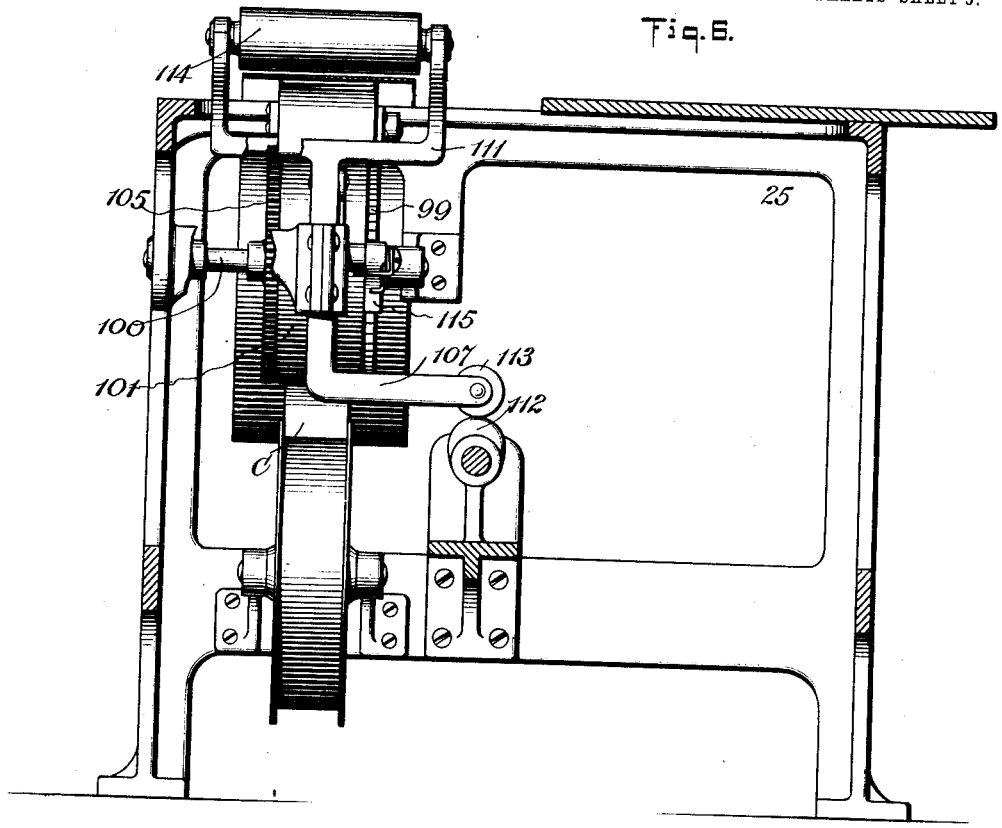
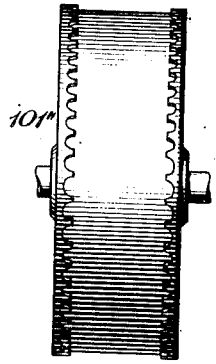
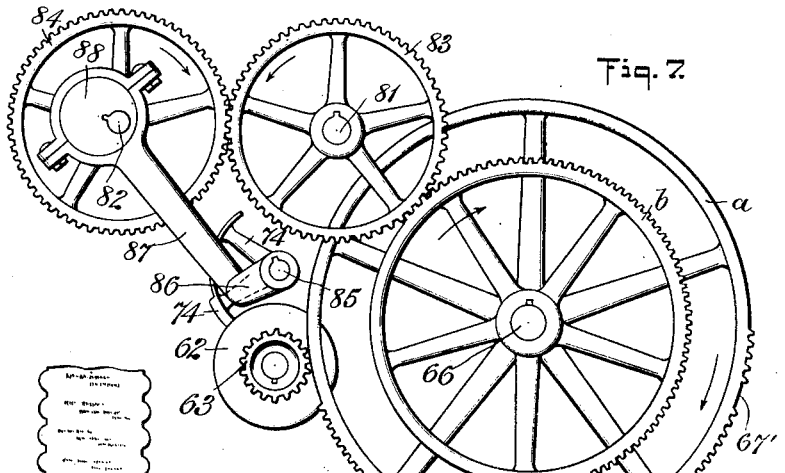
WITNESSES
INVENTOR
Elmer T. Peterson
BY
ATTORNEYS E. T. PETERSON.
NEWSPAPER WRAPPING AND LABELING MACHINE.
APPLICATION FILED JAN. 8, 1914.
1,113,823.
Patented Oct. 13, 1914.
8 SHEETS—SHEET 6.
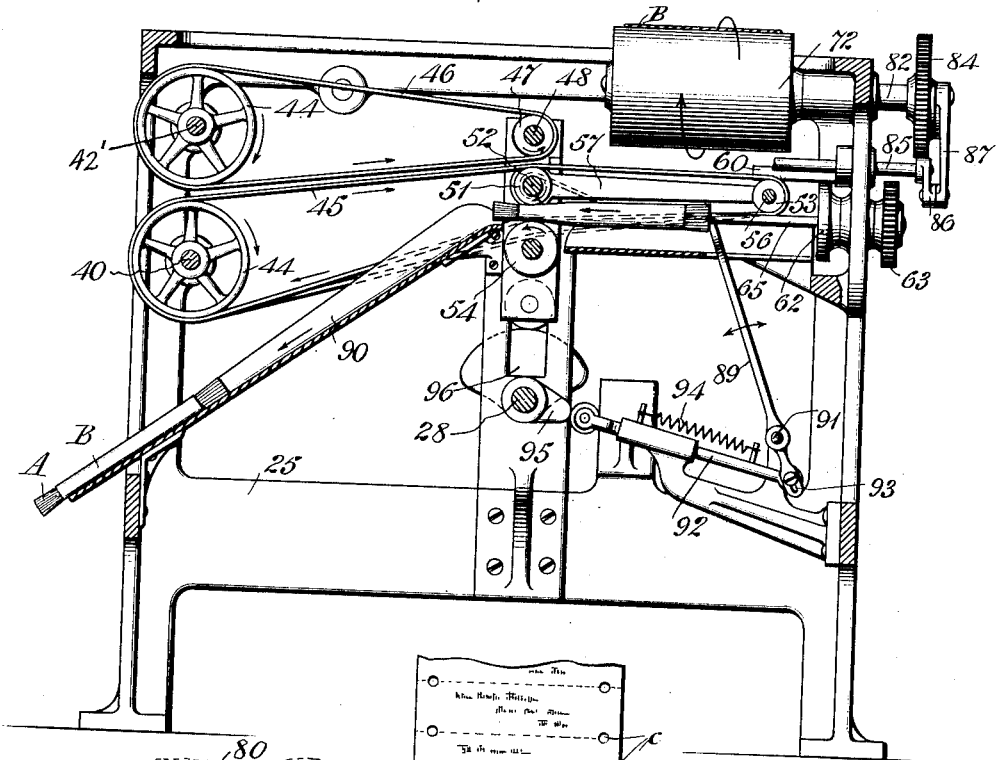
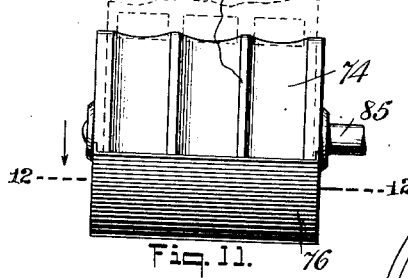
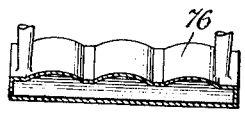
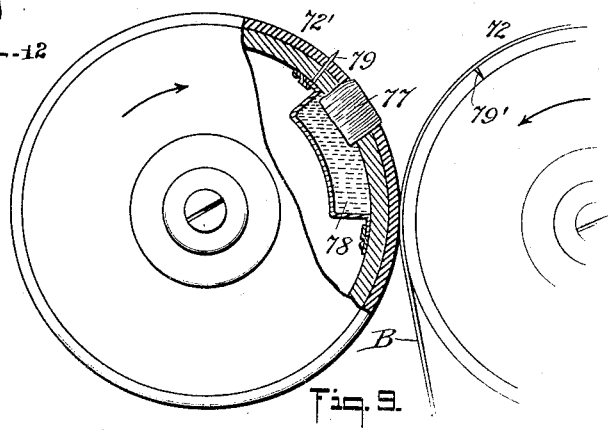
WITNESSES
INVENTOR
Elmer T. Peterson
BY
ATTORNEYS E. T. PETERSON.
NEWSPAPER WRAPPING AND LABELING MACHINE.
APPLICATION FILED JAN. 8, 1914.
1,113,823.
Patented Oct. 13, 1914.
8 SHEETS—SHEET 7.
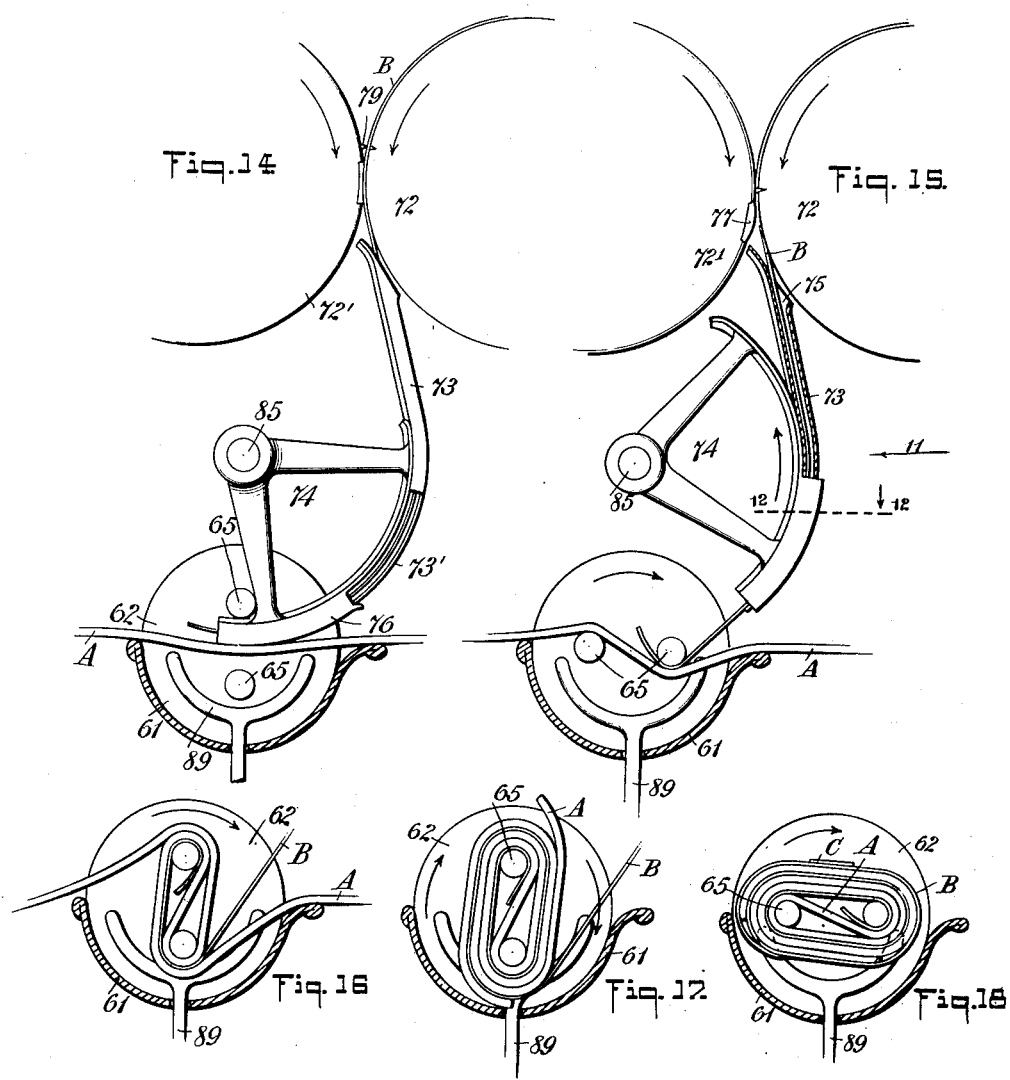
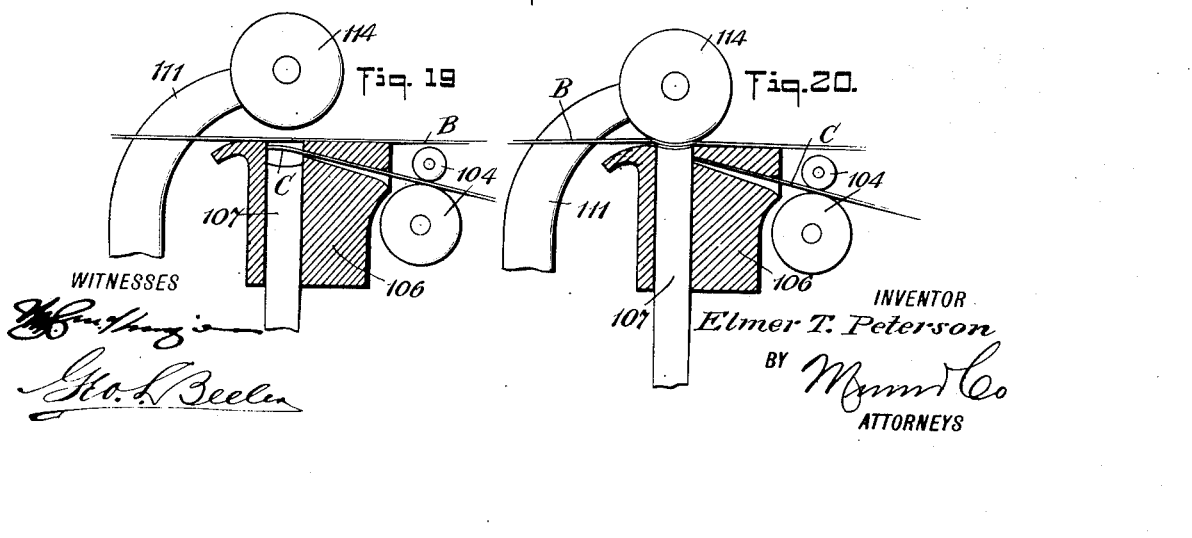
WITNESSES
INVENTOR
Elmer T. Peterson
BY
ATTORNEYS

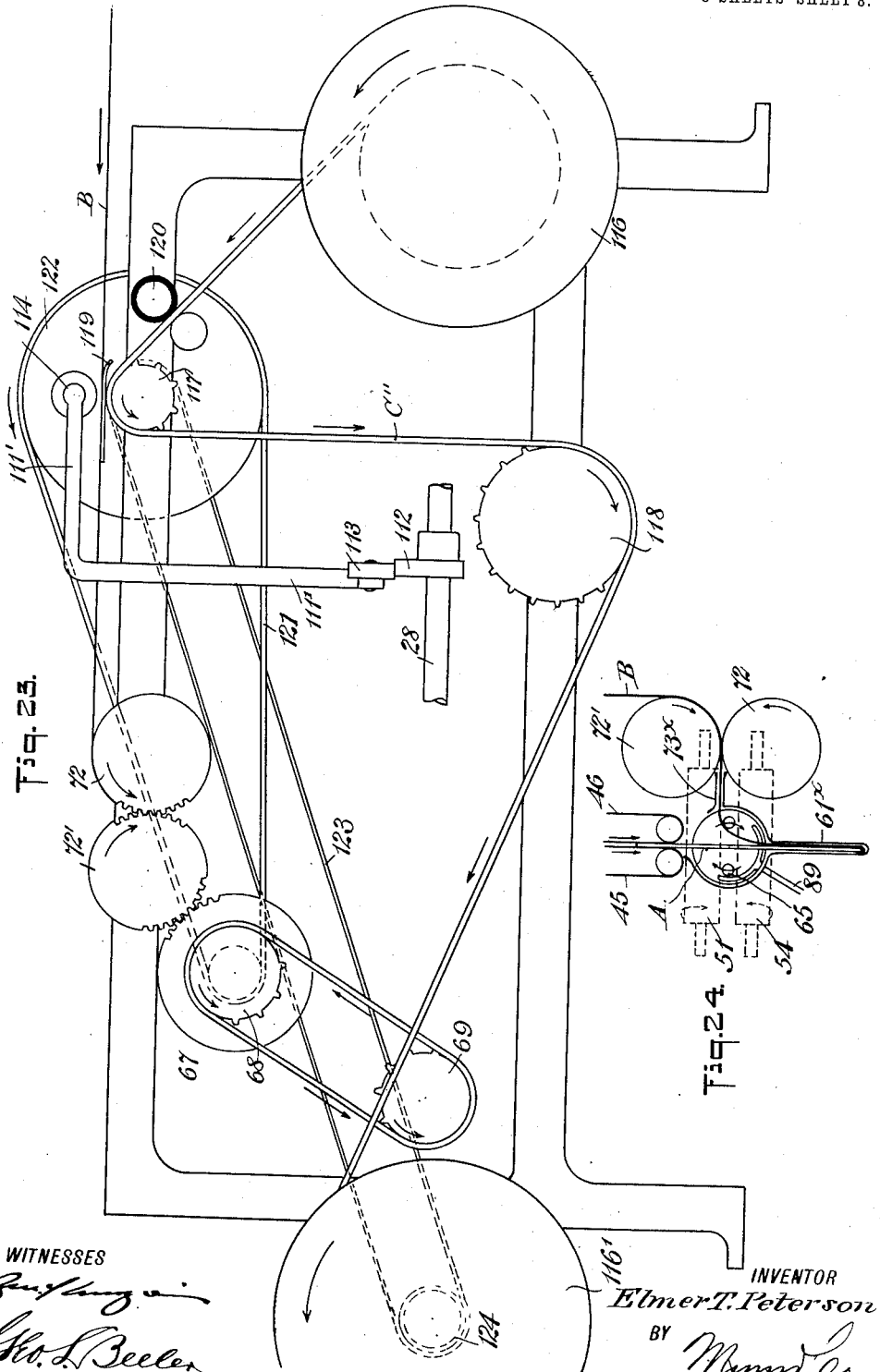

UNITED STATES PATENT OFFICE.

ELMER THEODORE PETERSON, OF CIMARRON, KANSAS.

NEWSPAPER WRAPPING AND LABELING MACHINE.

1,113,823.   Specification of Letters Patent.   Patented Oct. 13, 1914.

Application filed January 8, 1914. Serial No. 811,049.

*To all whom it may concern:*

Be it known that I, ELMER T. PETERSON, a citizen of the United States, and a resident of Cimarron, in the county of Gray and State of Kansas, have invented a new and Improved Newspaper Wrapping and Labeling Machine, of which the following is a full, clear, and exact description.

This invention relates to wrapping machines or the like and has particular reference to machines of the class indicated which are adapted to wrap, seal and label automatically newspapers or similar articles.

One of the objects of the invention is to generally improve this type of machinery and make use of a peculiar construction of means for introducing a paper wrapper into position for coöperation with a wrapping fork or yoke, means being provided to rotate said fork to cause the simultaneous wrapping of the paper and the wrapper therefor.

Another object of the invention is to improve the mechanism for controlling the application of labels to the wrapping paper previous to the application thereof to the newspapers.

The foregoing and many other objects of the invention will hereinafter be more fully described and claimed and illustrated in the drawings forming a part of this specification in which like characters of reference indicate corresponding parts in all the views, and in which—

Figure 1 is a plan view of a preferred embodiment of the invention; Fig. 2 is a vertical longitudinal section substantially on the broken line 2—2 of Fig. 1; Fig. 3 is a similar view on the line 3—3; Figs. 4, 5 and 6 are vertical transverse sections on the corresponding broken lines of Fig. 2; Fig. 7 is a rear elevation of the operating devices as viewed in the direction of the arrow 7 in Fig. 1; Fig. 8 is a view corresponding to Fig. 5 but with the parts in a changed position; Fig. 9 is a detail of the wrapper feed rollers showing the pasting and cutting devices; Fig. 10 is a detail of the knife carried by one of said rollers; Fig. 11 is a side elevation of the wrapper guide, as it will be seen from the position indicated by the arrow 11 in Fig. 15, but with the fixed guide removed; Fig. 12 is a transverse section on the line 12—12 of Figs. 11 and 15; Fig. 13 is a plan view of a section of the label strip; Figs. 14 and 15 are detail views in different positions of the wrapper rollers and guides; Figs. 16, 17 and 18 are views showing different stages of progress of the wrapping of the newspaper together with the wrapper; Figs. 19 and 20 are views, in different positions, of the label affixing mechanism; Fig. 21 is a face view of a modified form of label strip wheel; Fig. 22 is a plan view of a section of the label strip adapted for such wheel; Fig. 23 is a diagram in side elevation of a modified form of parts of the construction; and Fig. 24 is a vertical detail view in diagram of a slight modification of the wrapping mechanism.

The several parts of the device may be made of any suitable materials, and the relative sizes and proportions, as well as the general design of the mechanism, may be varied to a considerable extent without departing from the spirit of the invention hereinafter more fully set forth and specifically claimed.

By way of brief general description my machine as herein illustrated comprises a main supporting framework of substantially rectangular form carrying operating devices adapted to be operated from a single source of power and including devices for feeding newspapers in folded form into the rolling and wrapping mechanism, means to introduce wrapping paper to the wrapping mechanism, means to apply an address or a label to each wrapper prior to the time it reaches the wrapping mechanism, and means to eject the wrapped paper from the wrapping mechanism.

Referring to the drawings by reference characters I show a frame 25 having an open rectangular top 26, the same being supported upon legs 27 and of a sufficient height and length to accommodate within the structure nearly all of the operating parts. The main shaft 28 extending longitudinally along and journaled within the frame is supported therein by bearings 29, 30 and 31.

At 32 I show a belt operating over a driving pulley 33 mounted upon a short shaft 34 journaled in the frame at 35 and having on its inner end a pinion 36 meshing with and driving a gear 37 connected to the main shaft. Said power devices thus far described will be understood as being referred to as examples rather than the only possible types of such devices.

Secured to the short shaft 34 between the end of the frame and the pulley 33 is a gear 38 which consequently is driven in the same direction as the pulley 33 and pinion 36. Said gear, through an idler 39 suitably located, drives a countershaft 40 through a gear 41 also on the outside of the frame. Said gear 41 meshes with a similar gear 42 mounted upon another countershaft 42' above the first mentioned countershaft. Said countershafts carry four pairs of pulleys 44 spaced slightly vertically from each other and over which as many pairs of conveyer belts 45 and 46 operate in the direction indicated by the arrows on Fig. 5. The belts 46 are shorter than the others and operate over idler pulleys 47 mounted on a spindle 48 near the central part of the machine, said spindle being carried by a pair of vertically movable blocks 49 guided in standards 50. The two intermediate belts 45 operate inwardly over a roller 51 connected to a spindle 52, thence to and over rollers 53 near the rear portion of the frame, and thence return over another roller 54 journaled upon a spindle 55. The spindles 52 and 55 are also journaled in the blocks 49, and together with the blocks and the first mentioned spindle 48 constitute what may be termed an "elevator." The rollers 51 and 54 constitute a pair of grippers whose function will be described below. The outer belts 45 also operate over rollers or pulleys 53, said pulleys being carried by a shaft 56 carried by the rear ends of arms 57 journaled around the shaft 52 and held in a horizontal position against stop lugs 58 by any suitable means as, for instance, springs 59, said arms 57 being adapted, therefore, to be elevated with the elevator. The rear ends of the arms 57, however, are adapted to be deflected downwardly with respect to the main parts of the belts 45, and a stop finger 60 is provided to limit the upward movement of such ends when the elevator is lifted, as shown in Fig. 8.

At 61 I provide a substantially semi-cylindrical trough in which the newspaper, indicated at A, is adapted to be received and rolled as shown in Figs. 14 to 18. The front or outer end of said trough is open and the rear end is closed by a rotary head 62 in the nature of a disk secured to a shaft, to the other end of which is connected a pinion 63 on the rear and outer side of the frame, said shaft being journaled in a bearing 64. Said head 62 carries on its front face one or more fingers or prongs 65 shown in this case as two arranged parallel to each other and adapted to sweep around within the trough and around a fixed axis coinciding with the axis of curvature of the trough, their length being substantially the same as that of the trough. The normal position of the head and prongs is as shown in Fig. 14, the prongs being spaced from each other in the vertical plane, and the newspaper is delivered between them by the belt conveyers above described. The belts, however, operate on opposite sides of the trough 61 as shown in Fig. 3. The prongs 65 are rotated by the head 62 periodically during the continuous operation of the power devices, said periodical or intermittent movement of the prongs being effected by any suitable means.

Referring to Fig. 7 particularly, I show at 66 a shaft which carries a double gear member 67 at the rear end thereof on the outside of the frame, said double gear member including two mutilated gears 67$^a$ and 67$^b$ of different sizes. The shaft 66 carries on its inner end a sprocket wheel 68 having a chain connection with a similar wheel 69 connected on a shaft 70 journaled in the frame adjacent the power end thereof and driven by miter gears 71 from the power shaft 28 above referred to. The gear 67$^a$, likes its companion, is driven continuously from the power devices, and has a set of teeth extending partially around its periphery and coöperating with the aforesaid pinion 63, whereby, during a portion of the rotation of the shaft 66 the pinion and the prongs will be rotated through three or four rotations. The number and location of the teeth on the gear wheel 67$^a$ will, of course, be designed to cause the rotation of the prongs 65 at a proper time with respect to other associated mechanisms.

At B I show a strip of paper to be made into wrappers for the several newspapers A, said strip being directed along above the machine from any suitable source of supply (not shown), and is delivered by means of a pair of feed rollers 72 and 72' journaled on parallel horizontal axes to and through a peculiar form of guiding mechanism comprising a fixed member 73 and a segmental pivoted member 74.

From Figs. 14 and 15, the operation of the guiding devices and their relation to the wrapping devices will be clearly understood. The member 73 consists of a flat tubular construction having an open mouth 75 to receive the wrapper, said wrapper passing downwardly through the member and being deflected laterally toward the prongs by means of a curved portion 73', the form of which corresponds to the form of the movable member 74 having an arc-shaped flat tubular member 76 which telescopes over the curved end 73' of the fixed member. The cross sectional form of the movable member is shown in Fig. 12.

Referring to Fig. 9 the feed roller 72' is provided with a paste applying device or brush 77 which communicates at its inner end with a suitable quantity of liquid paste contained in a chamber 78. Any suitable number of brushes 77 may be employed, and in Fig. 1 I show three of such brushes in longitudinal alinement but spaced from each other slightly as shown at 77'. The wrapper B is cut off in lengths as it passes in between the rollers 72 and 72', the cutting being effected by means of a knife 79 adapted to project into a slot 79' in the opposite roller. Said knife 79 may be provided with teeth, as shown in Fig. 10, if desired. The paste is applied by the brushes 77 to the wrapper adjacent its upper end, and by reason of the spaces 77' between the brushes there are left ungummed short portions of the wrapper which register, as suggested in Fig. 11, in dotted lines, with ribs or guides 80 of any suitable design or construction, and constituting a part of the guiding device 74. By this arrangement wet gum carried by the wrappers does not come into contact with any part of the machine. The fixed guide 73 may also be provided with corresponding ribs for the same purpose. The feed rollers are mounted upon shafts 81 and 82 having gears 83 and 84 in constant mesh with each other and of the same size. These wheels and rollers are adapted to be rotated intermittently by the above described mutilated gear 67$^b$ which has throughout a portion of its periphery a number of teeth equal to the number of teeth of each of said wheels 83 and 84 whereby, for each complete rotation of the gear 67, the rollers will be given one complete rotation, delivering a single wrapper into the guiding devices 73 and 74. The pivoted member 74 of the guiding devices is mounted upon a rock shaft 85 to which is connected a crank 86 having a connecting rod 87 leading to an eccentric 88 fixed to the shaft 82. For each rotation of the shaft 82, therefore, the member 74 will be given one oscillation. By reason of this oscillation of the member 74, the lower end thereof is adapted to project between the prongs 65, as shown in Fig. 14, for the purpose of delivering the forward end of the wrapper B into position to be gripped between the upper surface of the paper A and the lower surface of the upper prong 65 when the guide 74 is lifted, as shown in Fig. 15, out of the way of the prongs after they start to wrap the paper and wrapper therearound, as shown in the succeeding figures. The side edges of the trough 61 cause the paper and wrapper to be rolled together snugly, and since the wrapper is longer than the folded newspaper, the gummed end of the wrapper will coöperate with a portion of the same rather than with the newspaper, as shown in Fig. 18. The position of the eccentric 88 is such that the oscillating member 74 will be maintained in its elevated position while the wrapping of the paper takes place.

At 89 I show an ejector arm which is adapted to sweep along the bottom of the trough 61 just at the time the package reaches the position shown in Fig. 18, the driving gear 67$^a$ for the wrapping prongs being inoperative momentarily by reason of an untoothed space 67', giving the ejector arm an opportunity to throw the newspaper package from the prongs while said package is in the position shown in Fig. 18, but immediately thereafter the remaining teeth of the wheel 67$^a$ give a slight further rotation to the prongs so as to restore them to normal position as shown in Fig. 14. The ejector 89 just described coöperates with the above described gripping rollers 51 and 54, as shown in Fig. 8, which after being elevated or shifted transversely of the horizontal plane of the axis of the wrapping device, receive the package as it is delivered from the prongs by the ejector arm and in flat position, the direction of rotation of said rollers continuing the movement of the package, completing the sealing thereof and delivering it to a discharge chute 90 which may lead to any desired point or other conveyer.

The ejector arm 89 may variously be mounted and operated by any desired mechanism. As shown herein it is pivoted at 91 and is operated by a plunger 92 having pin and slot connection 93 at the lower end of the ejector arm. Said plunger 92 is operated in one direction against the tension of a spring 94 by means of a cam 95 secured to the main power shaft 28. Said cam is comparatively sharp, giving a quick movement of the ejector through an anti-friction roller, and after passage of the cam said spring 94 returns the ejector arm to its normal position shown in Fig. 5.

The primary object of the elevator above described is to vary the positions of the rollers 51 and 54 with respect to the newspaper. By referring to Figs. 5 and 8 it will be apparent that since the rollers always operate in the same direction and the newspaper is carried into wrapping position by the parts, as shown in Fig. 5, the lower surface of the roller 51 is idle in this position, but when elevated said lower surface becomes a gripping surface serving to operate the paper in the opposite direction, as shown in Fig. 8. The elevation of the elevator is effected by means of cams 96 also carried by the main shaft 28, each acting upwardly against a roller 97 journaled upon the lower end of the adjacent block 49 of the elevator.

In the preferred form of the invention the addressing of the newspapers is performed by applying printed labels severally to the individual wrappers B, said labels being provided in a strip C, as shown in Fig. 13, or as shown at C′, Fig. 22. The mechanism for controlling the labels comprises a ratchet wheel 99 connected to a shaft 100 upon which is secured a roller 101. The label strip may be provided with any suitable positive means for controlling its position upon the roller such, for instance, as holes c along its edges which receive the teeth 101′ on said roller or, as shown in Fig. 22, the edges of the strip may be notched, as shown at c′, coöperating with a correspondingly formed roller 101″. The label strip C leads from the roller 101 between a pair of paste applying rollers 102 communicating with a paste pan 103 and thence the strip is delivered between a pair of feed rollers 104 driven by gearing including a wheel 105 connected to the shaft 100 on the opposite end of the roller from the ratchet wheel. From the feed rollers 104 the strip passes through a cutter including a fixed member 106 and the vertically reciprocating knife 107 shown best in Figs. 19 and 20. Said knife constitutes the upper end of a shank pivoted at 108 to a lever 109 pivoted on a fixed part of the frame at 110. The other end of the lever 109 is pivoted to a yoke 111 which is elevated periodically by means of a cam 112 connected to the power shaft 28 and acting upon a roller 113 at the lower end of the yoke. Said yoke comprises two arms extending upwardly on opposite sides of the wrapping paper B, and said arms carry a pressure roller 114 adapted to coöperate with the upper surface of the wrapping paper simultaneously with the elevation of the cutter 107, a single label being sheared from the strip C by the upper end of the cutter 107 and by it is applied to the lower surface of the wrapping paper, as shown in Fig. 20. When the cutter plunger 107 returns downwardly to its normal position, as shown in Figs. 3 and 19, a pawl 115 carried by the lower end thereof will actuate the ratchet wheel 99 causing the label strip C to move upwardly one step.

In the diagrammatic modification of Fig. 23, the addressing mechanism comprises an address strip C″ operating from one drum 116 over a platen 117 and an idler 118 to another drum 116′ located at any convenient place. This strip C″ may comprise a connected chain of stereotype address plates adapted to be brought successively step by step over the platen 117 and beneath a guard or plate 119. The wrapping paper B operates over this plate, and when the yoke 111′ with its pressure roller 114 is depressed, the impression is made upon the wrapper directly from the address plate through the guard 119. At 120 I indicate any suitable inking mechanism for applying ink to the address plates as they come along in turn. This form of the invention may include wrapping mechanism of the same character as that above described and including wrapper feed rollers 72 and 72′, a driving gear 67, and sprocket gearing 68 and 69 driven from any suitable source of power. The platen 117 may be operated at a slow speed and in any suitable manner from the gear 67 through an endless belt 121 operating over a large wheel 122. The drum 116′, in order to take up the strip C″ and keep it taut, is operated from the platen roller 117 through a belt 123 which may have a slip-clutch connection at 124 with said drum 116′ in order to compensate for the variations in diameters of said drum according to the winding up thereof of said strip.

In Fig. 24 the newspaper is delivered downwardly between the fingers of the wrapping device in a direction at right angles to that above described, and the wrapper paper is delivered through a guide $73^x$ so as to project over one of the fingers, and being in the path of the newspaper, will be carried thereby downwardly in to the pocket $61^x$ of the trough. The ejector mechanism in this form of the invention is or may be the same as above described.

Having thus described my invention, I claim as new and desire to secure by Letters Patent:—

1. In a machine of the class set forth, the combination of a wrapping device including a head journaled for rotation around a fixed axis, a pair of spaced prongs secured at one end to said head and parallel to said axis, means to introduce papers between said prongs, said paper introducing means including a plurality of rollers acting upon the paper to carry it between the prongs, and means to shift the rollers transversely of said axis, and an ejector arm serving to deliver the paper from wrapping position so as to be grasped by said rollers to deliver the paper from the wrapping device.

2. In a machine of the class set forth, the combination of a wrapping device including a pair of parallel prongs spaced from each other normally in a vertical plane, means to introduce a paper between said prongs, said introducing means including a plurality of rollers, means to elevate said rollers periodically whereby they serve to deliver the paper after being wrapped, means to actuate the wrapping device periodically, and a quick-acting ejector arm serving to force the wrapped paper from the wrapping device into position to be grasped by said rollers when they are elevated.

3. In a newspaper wrapping machine, the combination of a wrapping device including a pair of spaced prongs, means to introduce folded papers in succession between said prongs and to deliver wrapped newspapers therefrom, said introducing and delivering means including a series of rollers having axes lying in substantially the same plane and means to shift said rollers along said plane whereby two of them act to introduce a newspaper and subsequently one of the introducing rollers acts with a third roller to deliver a folded newspaper, means to introduce in succession individual wrappers between the newspapers and one of said prongs, and means to rotate the prongs periodically so as to wrap each newspaper and its wrapper simultaneously.

4. In a newspaper wrapping machine, the combination of a horizontal guide trough, a wrapping device comprising a head journaled for rotation at one end of said trough, and a pair of prongs connected to said head and movable around an axis coinciding with the axis of said trough, means to introduce a newspaper along said trough between said prongs, means to introduce wrappers into position to be wrapped with said newspapers, said last mentioned means including an oscillatory guide member movable into and out of the path of said prongs, and means to deliver the wrapped papers from the machine.

5. In a newspaper wrapping machine, the combination of a wrapping trough, wrapping devices operating in conjunction with said trough to form the paper into a roll, means to introduce an addressed and gummed wrapper into association with said newspaper whereby it will be wrapped simultaneously with the paper, said wrapper introducing means including a movable member adapted to move into and out of the path of the wrapping device periodically, and means movable along said trough to start the wrapped paper from the machine.

6. In a newspaper wrapping machine, the combination of a head journaled on a horizontal axis, a pair of prongs connected to said head and extending normally in the same vertical plane horizontally therefrom, means to introduce a newspaper between said prongs, removable means to introduce a wrapper between said newspaper and one of said prongs while said prongs are stationary, and means acting first upon the wrapper introducing means and then upon the head and prongs to first remove the introducing means out of the path of said prongs and subsequently to wrap the paper and wrapper together.

7. In a newspaper wrapping machine, the combination of a head, a pair of prongs carried by said head, means to rotate the head and prongs periodically, means to introduce a newspaper between the prongs, movable guide means to introduce a wrapper adjacent said newspaper between the prongs, means to operate said guide means, the last mentioned means being operated in alternation with the means for rotating the prongs, means for applying an address and paste to said wrapper while on its way to the newspaper, and means to deliver the wrapped paper from the machine.

8. The combination with a wrapping device and means to operate the same periodically, of means for introducing a newspaper into said device, means to introduce a gummed wrapper into position adjacent the newspaper for simultaneous wrapping therewith, said wrapper introducing means including a pair of feed rollers and guiding devices including fixed and movable telescopic parts, and means to periodically move the movable telescopic part in alternation with the operation of the wrapping device.

9. In a newspaper wrapping machine, the combination with a wrapping device and means to introduce newspapers in succession thereto, of means for introducing wrappers in succession to said device for simultaneous wrapping with the newspapers, said wrapper introducing means including a pair of rollers, cutting devices associated with the rollers, and guiding devices between the rollers and wrapping device, said guiding devices comprising a fixed member and a member telescopic therewith and movable in an arc of a circle into and out of the path of said wrapping device.

10. In a newspaper wrapping machine, the combination with a wrapping device including a pair of spaced prongs and means to introduce newspapers in succession between said prongs, of means to introduce addressed and gummed wrappers individually into association with the several newspapers at the wrapping device, said means including an arc-shaped tubular guide member projectable between the prongs, and means to act on said member and wrapping device in succession whereby the movable guide member will be out of the path of the wrapping device while the latter is in operation.

11. In a machine of the character set forth, the combination with a wrapping device and means to introduce newspapers thereto in succession, of means to introduce wrappers to said wrapping device whereby they may be wrapped simultaneously with the several newspapers, said wrapper introducing means including a pair of rollers, paste applying devices carried by said rollers, cutting devices for severing the individual wrappers, and guiding devices directing the wrappers from the rollers to the wrapping device, said guiding devices including means to prevent the paste carried by the wrappers from coming into contact with the mechanism.

12. In a newspaper wrapping machine, the combination of a head journaled for rotation around a fixed axis, a pair of prongs carried by said head and parallel to said axis, means to rotate the head and prongs periodically, means to introduce a newspaper between the prongs, guide means including telescopic members, one movable with respect to the other to introduce a wrapper adjacent said newspaper between the prongs, means to operate said guide means, the last mentioned means being operated in alternation with the means for rotating the prongs, means for applying an address and paste to said wrapper while on its way to the newspaper, and means to deliver the wrapped paper from the machine.

In testimony whereof I have signed my name to this specification in the presence of two subscribing witnesses.

ELMER THEODORE PETERSON.

Witnesses:
   CHARLIE M. DILLMON,
   JOHN T. HATCH.